(12) United States Patent
Kant et al.

(10) Patent No.: US 7,792,769 B2
(45) Date of Patent: Sep. 7, 2010

(54) APPARATUS AND METHOD FOR LEARNING AND REASONING FOR SYSTEMS WITH TEMPORAL AND NON-TEMPORAL VARIABLES

(75) Inventors: Shashi Kant, Cambridge, MA (US); Ram Srivastav, Brookline, MA (US)

(73) Assignee: Cognika Corporation, Cambridge, MA (US)

( * ) Notice: Subject to any disclaimer, the term of this patent is extended or adjusted under 35 U.S.C. 154(b) by 548 days.

(21) Appl. No.: 11/787,207

(22) Filed: Apr. 12, 2007

(65) Prior Publication Data

US 2008/0010232 A1 Jan. 10, 2008

(51) Int. Cl.
*G06F 17/00* (2006.01)
(52) U.S. Cl. .............................. 706/45; 706/55; 706/58
(58) Field of Classification Search .................. 706/52, 706/45, 55, 58
See application file for complete search history.

(56) References Cited

U.S. PATENT DOCUMENTS

| | | | |
|---|---|---|---|
| 5,802,506 A | 9/1998 | Hutchison | |
| 5,860,917 A | 1/1999 | Comanor et al. | |
| 6,125,194 A | 9/2000 | Yeh et al. | |
| 6,353,814 B1 | 3/2002 | Weng | |
| 6,687,685 B1 | 2/2004 | Sadeghi et al. | |
| 6,886,008 B2 | 4/2005 | Blayvas et al. | |
| 7,613,675 B2 * | 11/2009 | Hawkins et al. | 706/55 |
| 2003/0058340 A1 | 3/2003 | Lin et al. | |
| 2003/0126104 A1 | 7/2003 | Evans-Beauchamp et al. | |
| 2005/0246307 A1 | 11/2005 | Bala | |
| 2006/0104406 A1 | 5/2006 | Siltanen et al. | |
| 2006/0248026 A1 * | 11/2006 | Aoyama et al. | 706/12 |
| 2007/0005531 A1 | 1/2007 | George et al. | |
| 2007/0038558 A1 | 2/2007 | Nakatsugawa et al. | |
| 2007/0192271 A1 * | 8/2007 | George et al. | 706/52 |

OTHER PUBLICATIONS

Jeff Hawkins and Dileep George. Hierarchical Temporal Memory. Numenta Inc. May 10, 2006. _Internet Archive_. <http://web.archive.org/web/20060514053146/http://www.numenta.com/Numenta_HTM_Concepts.pdf>.*
Yedidia, J.S.; Freeman, W.T.; Weiss, Y., "Understanding Belief Propagation and Its Generalizations", Exploring Artificial Intelligence in the New Millennium, ISBN 1558608117, Chap. 8, pp. 239-236, Jan. 2003.*
Berliner, L. M.. Hierarchical Bayesian Time-series Models. Fundamental Theories of Physics. 1996, vol. 79.*
Vassilas, N., Kalapanidas, E., Avouris, N., and Perantonis, S. 2001. Intelligent techniques for spatio-temporal data analysis in environmental applications. In Machine Learning and Its Applications: Advanced Lectures, G. Paliouras, V. Karkaletsis, and C. D. Spyropoulos, Eds. Springer Lecture Notes in Artificial Intelligence, vol. 2049. Springer-Ver.*
Wikle et al. Hierarchical Bayesian space-time models. Environmental and Ecological Statistics 5, 117-154 (1998).*
Dagum, P. and Galper, A. 1995. Time series prediction using belief network models. Int. J. Hum.-Comput. Stud. 42, 6 (Jun. 1995), 617-632.*
Christopher K. Wikle. Hierarchical Models in Environmental Science. International Statistical Review / Revue Internationale de Statistique, vol. 71, No. 2 (Aug. 2003), pp. 181-199.*
Brendan Burns and Clayton Morrison. Temporal abstraction in Bayesian networks. In Association for the Advancement of Artificial Intelligence Spring Symposium, Palo Alto, CA, 2003.*

* cited by examiner

*Primary Examiner*—Donald Sparks
*Assistant Examiner*—David H Kim
(74) *Attorney, Agent, or Firm*—Kristofer E. Elbing

(57) ABSTRACT

In one general aspect, a method of deriving information about behavior of a target system is disclosed. The method includes accessing one or more temporal variables for the target system, providing an identifier node at the top of a hierarchy of a tree-structured belief network, and assigning a different subtree in the network to each of the accessed temporal variables. The method also involves accessing evidence data, and deriving information about the behavior of the target system for the evidence data based on the tree-structured belief network.

27 Claims, 7 Drawing Sheets

APPARATUS AND METHOD FOR LEARNING AND REASONING FOR SYSTEMS WITH TEMPORAL AND NON-TEMPORAL VARIABLES

FIELD OF THE INVENTION

The invention relates generally to the fields of machine learning, machine reasoning, and machine intelligence.

BACKGROUND OF THE INVENTION

Various models have been proposed to perform reasoning with spatiotemporal data, including Bayesian networks and neural networks. Bayesian networks provide a well-established way to represent causal relationships using a structure. But they are typically designed by humans with expertise in the problem domain, and can suffer from human error, ideologies, preconceived notions, and prejudices. The use of Bayesian networks can therefore produce inaccurate and incomplete representations of the problem domain.

Bayesian networks also tend to require extensive human involvement through design and training. This can make them very expensive to implement. Dynamic Bayesian belief networks, such as such as Hidden Markov Models, have also been proposed (see, e.g., "An introduction to hidden Markov models," by L. R. Rabiner and B. H. Juang, IEEE ASSP Mag., pp 4-16, June 1986.). But their development is even more complex, and is still fundamentally based on human effort.

Neural networks are computational systems that use interconnected modeled neurons, which may mimic cognitive or biological functions. These networks can be trained to process information for different types of problems. But they tend to exhibit "black box" characteristics, and the structure of the selected model generally cannot be used for causal analysis.

SUMMARY OF THE INVENTION

In one general aspect, the invention features a method of deriving information about behavior of a target system. The method includes accessing one or more temporal variables for the target system, providing an identifier node at the top of a hierarchy of a tree-structured belief network, and assigning a different sub-tree in the network to each of the accessed temporal variables. The method also includes accessing evidence data, and deriving information about the behavior of the target system for the evidence data based on the tree-structured belief network.

In preferred embodiments, the method can further include steps of accessing one or more static variables and assigning child nodes in the network to the accessed static variables. The step of deriving can include extracting a model of the target system from the network, and setting evidence data in the model. The method can further include the step of acquiring the evidence data from a computing apparatus input device. The method can further include the step of acquiring the evidence data from sensors. The step of extracting a model can employ a learning process to extract a Bayesian model from the network. The step of extracting a model can employ an expectation-maximization process. The step of assigning different sub-trees can assign nodes in the different sub-trees based on required temporal resolution, available data resolution, and computational limitations. The step of assigning different sub-trees can assign nodes in the different sub-trees automatically. The method can further include the step of adding arcs from the root node to the static nodes and to top-level ones of the dynamic nodes. The step of assigning different sub-trees in the network to the plurality of temporal variables can assign the variables in a temporal hierarchy at multiple time slices. The temporal variables can be organized such that samples at instants of time are represented by nodes. The temporal variables can be organized such that aggregate functions are represented at higher-level nodes. The aggregate functions can include at least one of: mean, maxima, and minima. Data used to develop the network can be discretized. The step of deriving can derive information about likely outcomes for the target system. The step of deriving can derive information about causes of target system behavior. The steps of accessing, providing, assigning, and deriving can be performed at least in part by computing apparatus, wherein the tree-structured belief network is stored in storage associated with the computing apparatus, and further including the step of presenting results of the step of deriving to a user on an output interface of the computing apparatus. The target system can be a physical system with the information derived for the target system being used to make changes to the physical system. The steps of providing and assigning can be completely automatic. The step of accessing can provide accesses a plurality of temporal variables and the step of providing can provide a plurality of sub-trees for the accessed temporal variables, with each sub-tree corresponding to one of the accessed temporal variables.

In another general aspect, the invention features a method of deriving information about the behavior of a target system that includes receiving a model of the target system that is based on a tree-structured belief network in which an identifier node is provided at the top of a hierarchy of the belief network, and a different sub-tree in the network assigned to each of one or more temporal variables. The method also includes the steps of accessing evidence data, and deriving information about the behavior of the target system for the evidence data based on the model.

In a further general aspect, the invention features a method of deriving information about the behavior of a target system that includes accessing one or more temporal variables for the target system, providing an identifier node at the top of a hierarchy of a tree-structured belief network, assigning a different sub-tree in the network to each of the temporal variables accessed in the step of accessing, and extracting a model of the target system from the network. In preferred embodiments, the step of extracting a model can employ a learning process to extract a Bayesian model from the network.

In another general aspect, the invention features a system for deriving information about behavior of a target system. The system includes a system interface, machine-readable storage for a tree-structured belief network, and tree-structured belief network interaction logic, which is operative to interact with the system interface and a tree-structured belief network stored in the machine-readable storage. The tree-structured belief network includes an identifier node at the top of a hierarchy of the tree-structured belief network, and a different sub-tree in the network assigned to each of one or more temporal variables.

In a further general aspect, the invention features a system for deriving information about behavior of a target system that includes means for interacting with the system, means for storing a tree-structured belief network, and means for interacting with the system interface and a tree-structured belief network stored in the machine-readable storage. The tree-structured belief network includes an identifier node at the top of a hierarchy of the tree-structured belief network, and a different sub-tree in the network assigned to each of one or more temporal variables.

In another general aspect, the invention features a memory for storing data for access by computing apparatus. The memory includes an identifier node at the top of a hierarchy of the tree-structured belief network, and a different sub-tree in the network assigned to each of one or more temporal variables.

Modeling systems according to the invention can provide enhanced learning and reasoning for target systems with temporal and non-temporal variables. By providing a network that includes temporal variable sub-trees, these systems can capture temporality inherently and elegantly. This can result in a model that can be more true to the target system, and therefore permit more accurate and precise learning and reasoning capabilities. This can be a significant improvement over many types of prior art approaches, such as simple Bayesian networks and neural networks, which tend not to handle temporal data very well.

Systems according to the invention can also provide models that are simpler to develop, work with, and comprehend. Capturing temporal and spatial patterns in a single model can make the model easy to develop, and in some cases, the model can simply emerge from data about the problem to be modeled. The hierarchical organization of models produced by the system also tends to make them easy to work with and understand.

BRIEF DESCRIPTION OF THE DRAWINGS

Various illustrative aspects and advantages of the present invention will become apparent upon reading the detailed description of the invention and the appended claims provided below, and upon reference to the drawings, in which:

DETAILED DESCRIPTION OF AN
ILLUSTRATIVE EMBODIMENT

Figure 1:
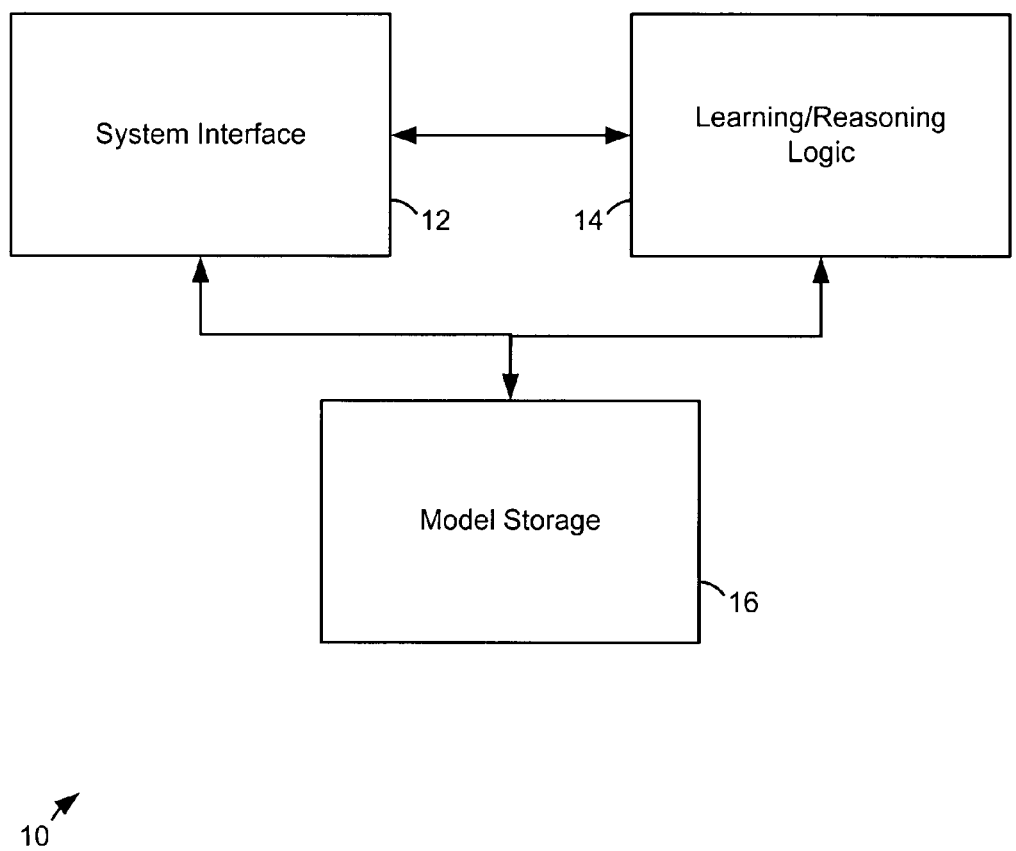
FIG. 1 is a block diagram of an illustrative modeling system employing principles according to the invention.

Referring to FIG. 1, an illustrative modeling system according to the invention can include a system interface 12, reasoning and/or learning logic 14, and network storage 16. The system interface can be a user interface that allows system designers and/or end users access to the system, such as through a keyboard/pointing device and a display. It can also include data communication logic that allows evidence data or model elements to be communicated to the system. And it may communicate with sensors to obtain readings to be processed by the system.

Generally, the reasoning/learning logic 12 uses a model of a target system stored in the network 14 to derive information about the target system. The modeling system can derive information about sounds, images, moving images, electromagnetic signals, chemical data, biological data, economic data, or any other suitable type of input for a target system. Examples of the many possible applications of the system include enhanced Natural Language Processing (NLP), Natural Language Understanding (NLU), pattern recognition, noise filtering, financial market analysis, cost analysis and projections, optimal resource and deliverable quota allocation, real time decision support for automatic system controls, risk identification systems, prospecting (e.g., oil), threat profiling, supply chain management, clinical decision-making, drug development, as well as clinical trial design, management and analysis. The system can also be applied to networks, such as the internet, for tasks such as malware detection, searching, and load balancing. The system can also be applied to knowledge extraction from information in various forms and from various sources with applications in search using cell phones, search using internet and organizational knowledge management and applications for quick extraction of relevant knowledge from such systems.

The various parts of the system can be implemented using dedicated hardware, a specially programmed general-purpose computer, or a combination of both. In the example presented below, the system is implemented using Microsoft Windows®-based computers. But other software platforms could of course also be supported, such as Linux® or Unix® platforms.

Figure 2:
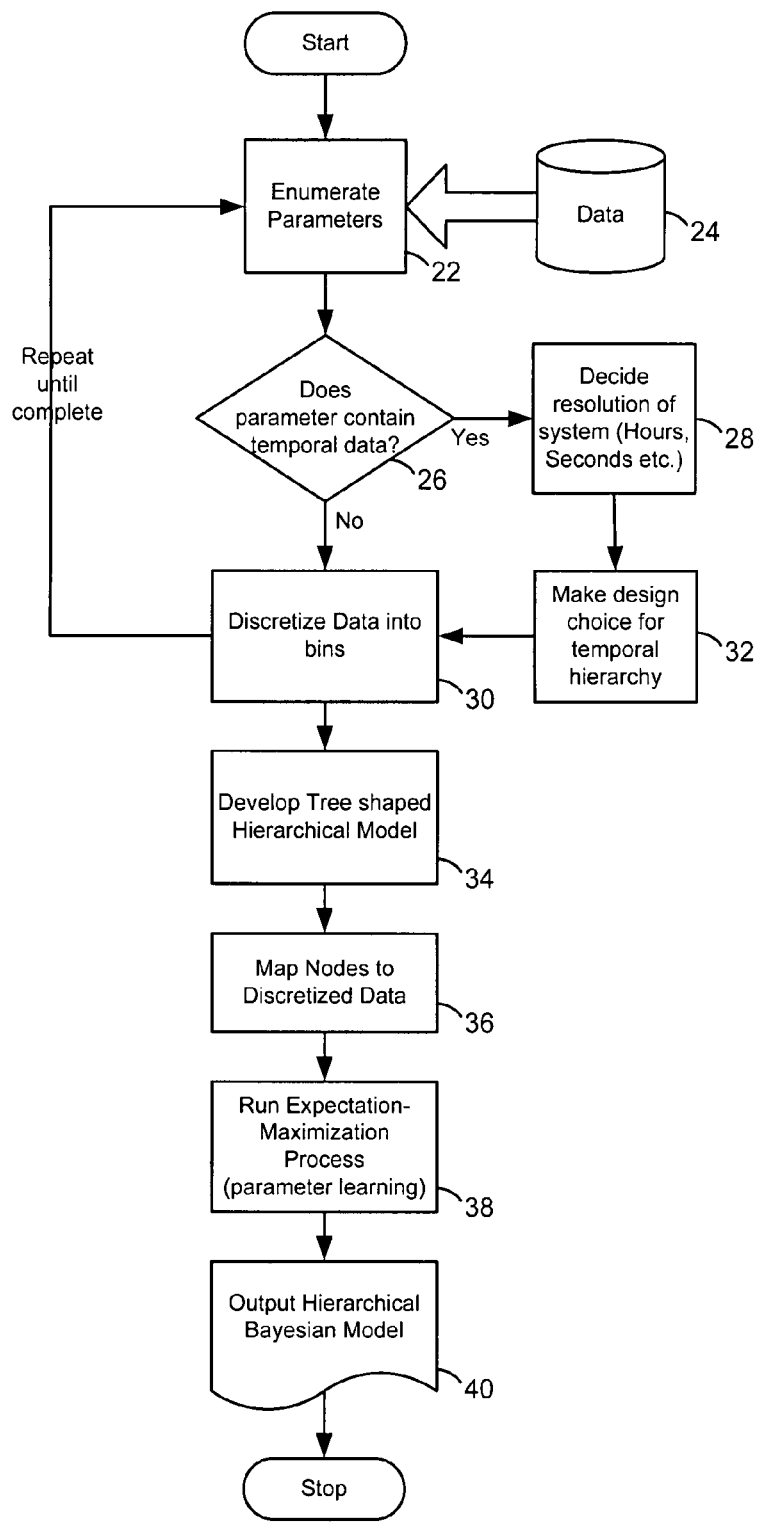
FIG. 2 is a flow chart outlining the basic steps in constructing a model of the data for the system of FIG. 1.

Referring to FIG. 2, use of the system involves the creation of a specialized belief network that processes data in a tree-shaped hierarchy representing spatiotemporal data input at the lowest layer. This model allows the system to infer a hierarchy of causes from data and use the causes to make predictions about likely outcomes. The network can be developed manually, automatically, or semi-automatically.

Development of the network begins with the enumeration of parameters (step 22) from a design data set 24 for the target system. If the parameters contain temporal data (step 26) a decision is made on the temporal resolution of the system by selecting a set of time units, such as hours or seconds (step 28). A design choice for a temporal hierarchy is then made (step 32), and the data are discretized into bins (step 30). These steps are repeated until all of the data have been processed.

A tree-shaped hierarchical model 50 is then developed (step 34), and nodes are mapped into discretized data (step 36). An expectation maximization (parameter learning) process is then applied by a learning application to the discretized data (step 38), and a hierarchical Bayesian model is output (step 40). This model can then be used to derive information about the behavior of the target system, such as predictions about its future behavior or the causes of given behaviors. Expectation maximization is described, for example in "Maximum likelihood from incomplete data via the EM algorithm," by Arthur Dempster, Nan Laird, and Donald Rubin, Journal of the Royal Statistical Society, Series B, 39(1):1-38, 1977, which is herein incorporated be reference.

Table 1 shows an illustrative example of a spatiotemporal data set consisting of three static parameters and two dynamic parameters. The static fields are fields that do not vary over time, or vary negligibly over time. The dynamic fields are fields that are measured at different instances of time.

TABLE 1

| | Static Fields | | | | | Dynamic Fields | |
|---|---|---|---|---|---|---|---|
| ID | Field-1 | Field-2 | Field-3 | Date | Time | Dynamic Field-1 | Dynamic Field-2 |
| 1 | Value | Value | Value | d1 | T1 | Value – t1 | Value – t1 |
| 1 | Value | Value | Value | d1 | T2 | Value – t2 | Value – t2 |
| | . | | | | . | | |
| 1 | Value | Value | Value | d1 | tn | Value – tn | Value – tn |
| 2 | Value | Value | Value | d1 | T1 | Value – t1 | Value – t2 |
| 2 | Value | Value | Value | d1 | T2 | Value – t2 | Value – t2 |
| | . | | | | . | | |
| 2 | Value | Value | Value | d1 | tn | Value – tn | Value – tn |
| 3 | Value | Value | Value | d1 | T1 | Value – t1 | Value – tn |
| 3 | Value | Value | Value | d1 | T2 | Value – t2 | Value – tn |
| | . | | | | . | | |
| 3 | Value | Value | Value | d1 | tn | Value – tn | Value – tn |
| | . | | | | . | | |
| N | Value | Value | Value | d1 | T1 | Value – tn | Value – tn |
| N | Value | Value | Value | d1 | T2 | Value – t1 | Value – tn |
| N | Value | Value | Value | d1 | T3 | Value – t2 | Value – tn |
| | . | | | | . | | |
| N | Value | Value | Value | d1 | tn | Value – tn | Value – tn |

Figure 3:
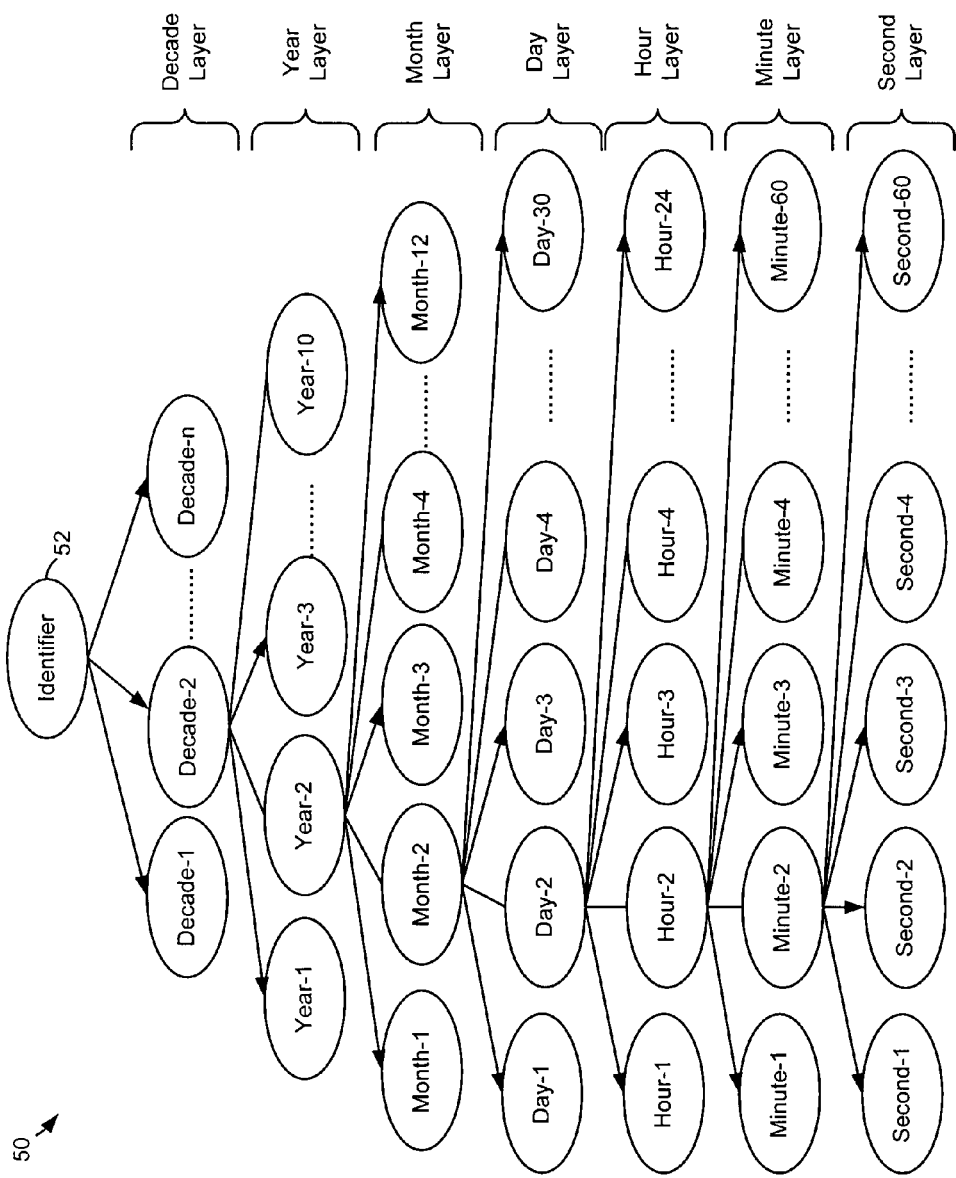
FIG. 3 is a schematic representation of a illustrative hierarchy for a dynamic variable with a single substructure shown for use with the system of FIG. 1.

Referring to FIG. 3, for each of the dynamic parameters, a sub-tree 50 similar to the one shown is created. This sub-tree shows a hierarchy of sequences (sequences of sequences) from decades to seconds. The hierarchy could be expanded to higher order sequences e.g. centuries or decades or lower order sequences e.g. milliseconds, or nanoseconds. The sequences also do not need to correspond to exact units, as presented below in connection with Example 1.

Depending on the availability of data, the values in the higher order time slices could be defined by one of the following aggregate functions:

the maxima of the parameter across the time-slice (decade, year, month, . . . ),
the mean of the parameter across the time-slice (decade, year, month, . . . ), or
the minima of the parameter across the time-slice (decade, year, month, . . . ).

Similarly, for lower order time-slices the values could be one of the following disaggregating functions:

the maxima of the parameter across the time-slice (decade, year, month, . . . ) divided by the number of intervals
the mean of the parameter across the time-slice (decade, year, month, . . . ) divided by the number of intervals, or
the minima of the parameter across the time-slice (decade, year, month, . . . ) divided by the number of intervals.

The design decisions for the sub-tree are made based on available data, computational power available, and resolution of inference needed.

Figure 4:
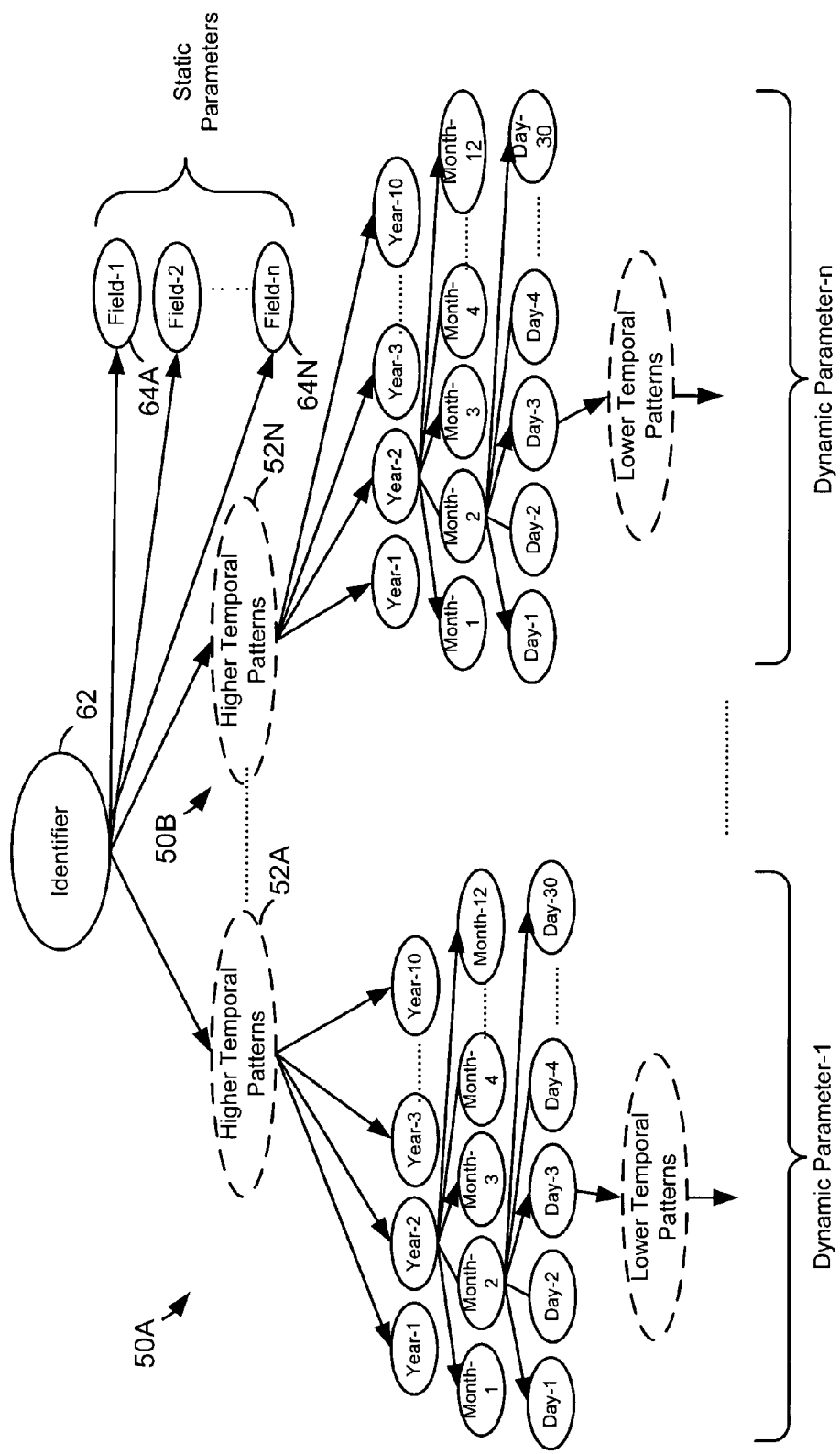
FIG. 4 is a schematic representation of an overall spatiotemporal model of data containing static and dynamic parameters with a single substructure shown, for use with the system of FIG. 1.

Referring to FIG. 4, an overall network 60 includes an identifier 62 as a root node. Child nodes 64A . . . 64N depending from the root node are assigned to static variables. And sub-trees 50A . . . 50N are assigned to data for the temporal variables.

Figure 5:
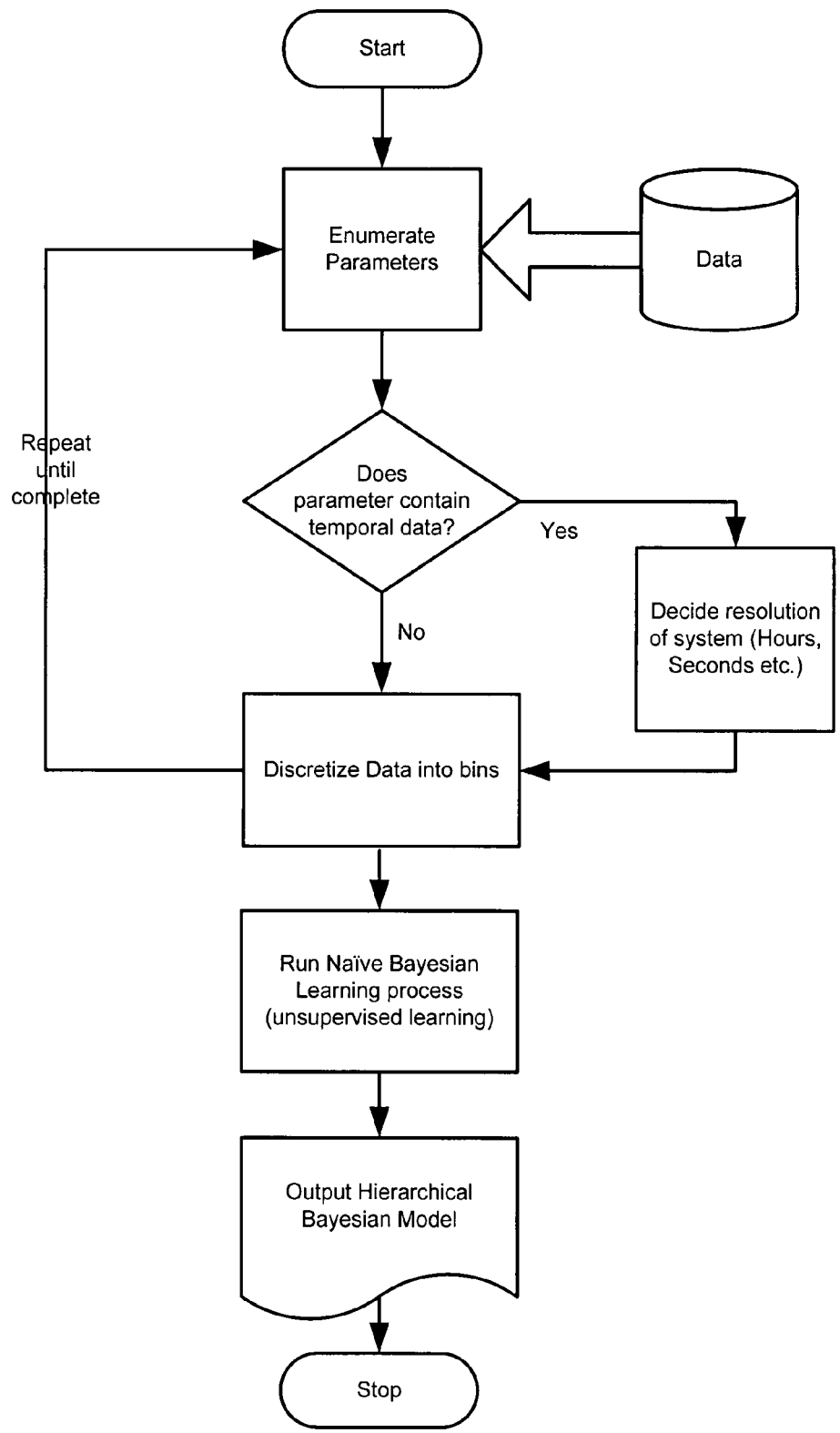
FIG. 5 is a flow chart showing an unsupervised learning approach for the system of FIG. 1.

Referring to FIG. 5, the system is also capable of learning in an unsupervised or semi-supervised mode. Once the data is arranged into a temporal hierarchy as described above, with the identifier node at the top and the various discrete temporal dimensions (sequences and sequences of sequences). An unsupervised learning process, such as Naïve Bayesian Learning, is applied to the data generate a hierarchical model with arcs from the ID node to the static and the dynamic elements. Naïve Bayesian Learning is described in more detail in "Machine Learning," by Tom Mitchell, McGraw Hill, 1997 (Ch. 6), which is herein incorporated by reference.

In the unsupervised and semi-supervised cases, the designer has much less control in the design of the network, such as its hierarchy and level of resolution. This approach can yield an almost entirely automated mechanism of learning, which can take as input the data arranged in the form described above and generate a model with minimal supervision. Embodiments of this type may be useful for applications where exceedingly complex datasets exist which cannot be easily analyzed by human analysts, or where domain knowledge is sparse and therefore the designer cannot conceive of an a priori hierarchy.

Figure 6:
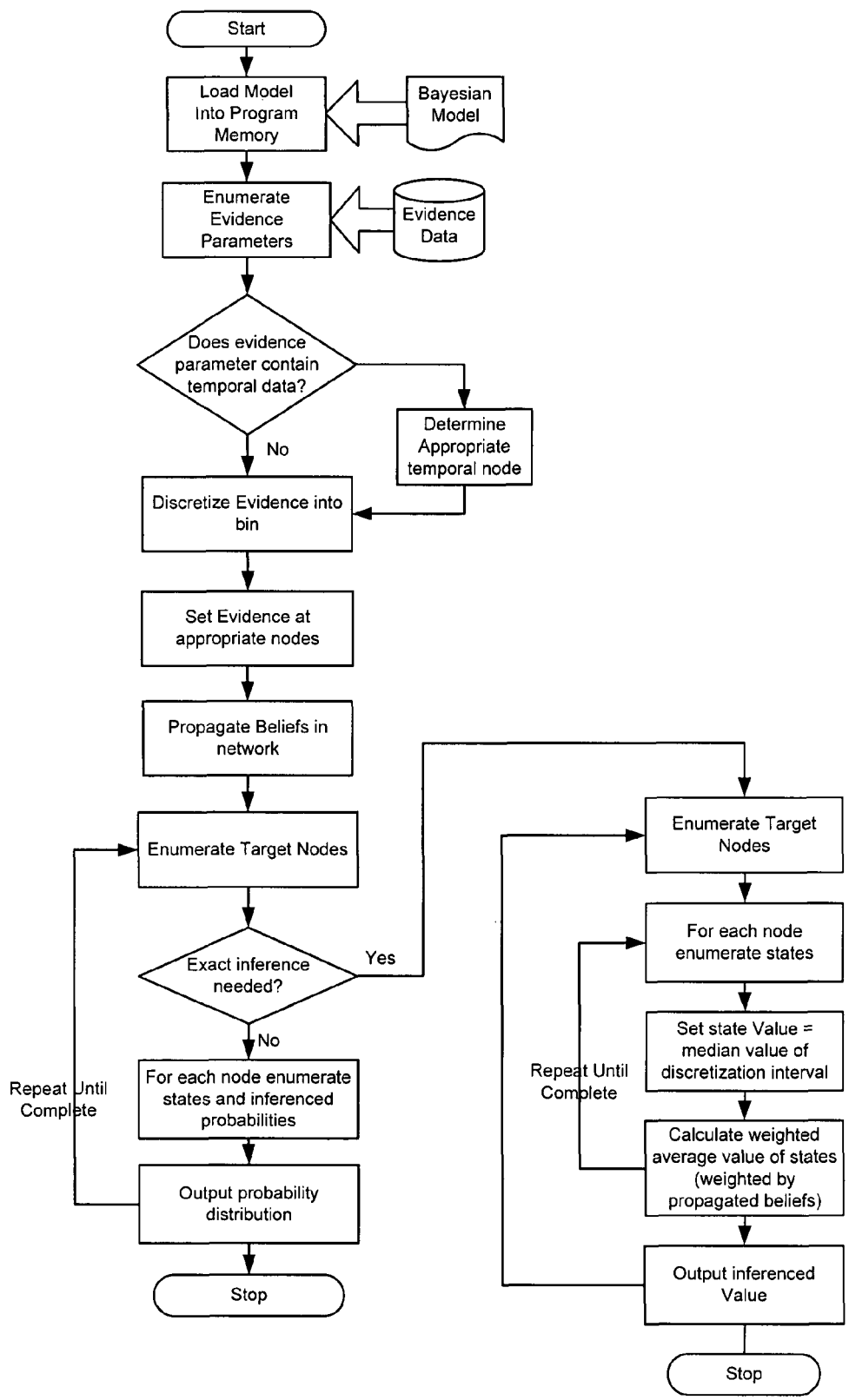
FIG. 6 is a flow chart showing querying processes for the system of FIG. 1.

Referring to FIG. 6, once the model is trained it is available for querying. The system performs the querying process by setting evidence in the network from partial inputs and observing the resultant a posteriori distribution at the other nodes. The model is first loaded into the program and the evidence data is discretized in a similar fashion as the training model. The evidence is then set to the trained model at the appropriate nodes. Once the evidence is set, the beliefs are propagated across the network to calculate the posterior beliefs using an process such as Pearl Belief Propagation. Pearl Belief Propagation is described in "Probabilistic Reasoning in Intelligent Systems," by Judea Pearl, Morgan-Kaufman Publishers, SanFrancisco, Calif., 1988, which is herein incorporated by reference.

Once the beliefs are propagated, the target nodes could be a selection or all of the nodes for which evidence has not been set. The maximum a posteriori (MAP) state of the target nodes is the state for which the posterior probability is highest. In cases where a continuous value for inference is needed, the weighted average of the states' values is calculated, weighted by the posterior probabilities of each state. An individual state value is generally the mean of the lowest and highest values in the interval. However, the designer can manually estimate the individual state values.

The following table illustrates how this might work a node with 4 states that measure temperature:

| State | State Value | Posterior Probability |
|---|---|---|
| T0_10 | 5 | 0.004 |
| T10_12 | 11 | 0.016 |
| T12_20 | 16 | 0.485 |
| T20_30 | 25 | 0.495 |

The exact inference value would Be

Inference=5×0.004+11×0.016+16×0.485+25×0.495=20.331

EXAMPLE 1

Figure 7:
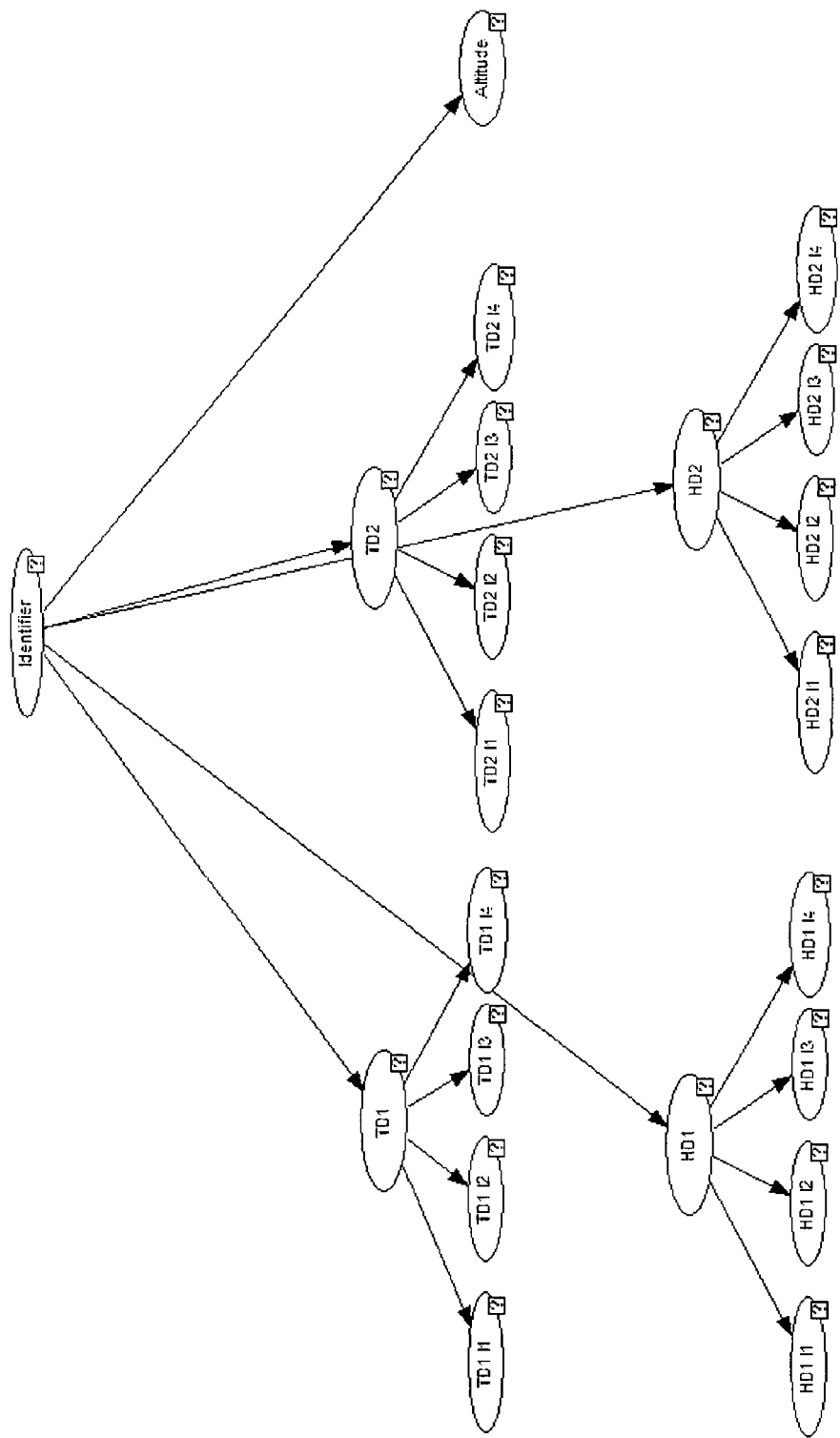
FIG. 7 is a screen shot of a block diagram of a Bayesian network produced for weather forecasting by the system of FIG. 1.

Referring to FIGS. 2 and 7, a specific illustrative implementation will now be described. This implementation is a weather forecasting system that is based on weather data consisting of two dynamic or temporal parameters, namely, temperature (expressed in degrees Fahrenheit) and relative humidity (expressed as a percentage). The data also includes one static or time invariant parameter, namely altitude (expressed in feet above sea level). The dynamic parameters were measured for three consecutive days at six hour intervals. The training data are shown in Table 2.

TABLE 2

| Location | Date | Time | Temperature(F.) | Relative Humidity(%) | Altitude (ft) |
|---|---|---|---|---|---|
| Boston, MA | Jan. 01, 2004 | 0:00 | 14.3 | 81 | 140 |
| Boston, MA | Jan. 01, 2004 | 6:00 | 23.9 | 61 | 140 |
| Boston, MA | Jan. 01, 2004 | 12:00 | 27.2 | 77 | 140 |
| Boston, MA | Jan. 01, 2004 | 18:00 | 22.1 | 70 | 140 |
| Boston, MA | Jan. 02, 2004 | 0:00 | 11.9 | 75 | 140 |
| Boston, MA | Jan. 02, 2004 | 6:00 | 22.1 | 80 | 140 |
| Boston, MA | Jan. 02, 2004 | 12:00 | 28.8 | 82 | 140 |
| Boston, MA | Jan. 02, 2004 | 18:00 | 23.4 | 89 | 140 |
| Nashua, NH | Jan. 01, 2004 | 0:00 | 18.3 | 81 | 150 |
| Nashua, NH | Jan. 01, 2004 | 6:00 | 19.9 | 61 | 150 |
| Nashua, NH | Jan. 01, 2004 | 12:00 | 21.2 | 77 | 150 |
| Nashua, NH | Jan. 01, 2004 | 18:00 | 22.4 | 70 | 150 |
| Nashua, NH | Jan. 02, 2004 | 0:00 | 19.9 | 75 | 150 |
| Nashua, NH | Jan. 02, 2004 | 6:00 | 14.1 | 80 | 150 |
| Nashua, NH | Jan. 02, 2004 | 12:00 | 21.8 | 82 | 150 |
| Nashua, NH | Jan. 02, 2004 | 18:00 | 23.4 | 89 | 150 |

Development of the network begins with the enumeration of static and dynamic parameters (step 22) from the data set shown in Table 2. Because temporal data is present (step 26), a spatiotemporal model needs to be constructed. A decision is then made on the temporal resolution of the system by selecting a six-hour time interval (step 28). A design choice for a two-level temporal hierarchy is then made (step 32).

The continuous data for all the parameters was discretized into 4 bins (step 30). The model of discretization was the uniform counts method, which distributes the records to the bins as evenly as possible. The steps are repeated until all of the data have been processed.

A tree-shaped hierarchical model 50' is then developed (step 34), and nodes are mapped into discretized data (step 36). The higher level nodes TD1 (Temperature Day 1), TD2 (Temperature day 2), HD1 (Humidity Day 1) and HD2 (Humidity Day 2) to the aggregate (mean) of the temperatures for the day. The aggregate values are also discretized. An expectation maximization (parameter learning) process is then applied by a learning application to the discretized data (step 38), and a hierarchical Bayesian model is output to a file (step 40).

The learning process is now complete and the network can be used for inferencing, to derive information about the behavior of the target system, such as predictions of future weather. The inferencing process involves loading the saved network into program memory, and applying evidence data, such as the data listed in Table 3.

| Location | Date | Time | Temperature(F.) | Relative Humidity(%) | Altitude (ft) |
|---|---|---|---|---|---|
| Nashua, NH | Jan. 01, 2005 | 10:00 | | 77 | 144 |
| Nashua, NH | Jan. 01, 2005 | 18:00 | 22.0 | | |

60

The first record is set to node HD1 I2 and altitude is set to the altitude node since the measured quantity is for relative humidity for Day 1 and in the second 6-hourly time interval. Next, the observed temperature for record 2 is set as evidence to node TD2 I3 since it is for Day 2 and the 3rd 6-hourly time interval. The target nodes are the complement of the evidence nodes in the network i.e. TD1, TD2, Altitude, HD1 I1, HD1 I3, HD1 I4, TD1 I1, TD1 I2 and TD1 I4. If exact inference is needed a weighted average for all the output states weighted by, the a posteriori probability is calculated. Otherwise, the maximum a posteriori state is displayed.

The training and inferencing code for this example was implemented using a single Windows®-based platform. Its core code was written in C++, and .NET/C# (C-Sharp) and Python were used for its application layer. But it is also contemplated that different parts of the system could be performed on different computers. For example, model development could take place on a first system, and the inferencing could be performed on an end-user system, such as a mobile terminal or a controller.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. A method of deriving information about behavior of a target system, comprising:
   accessing one or more temporal variables for the target system,
   providing an identifier node at the top of a hierarchy of a tree-structured belief network,
   assigning a different sub-tree in the network to each of the temporal variables accessed in the step of accessing, wherein nodes in the sub-tree are operative to hold evidence data of a same type at different levels of the sub-tree for each of the temporal variables, and wherein the evidence data at each of the different levels of each of the sub-trees is associated with a different level of granularity, accessing evidence data, and deriving information about the behavior of the target system for the evidence data based on the tree-structured belief network.

2. The method of claim 1 further including the steps of accessing one or more static variables and assigning child nodes in the network to the accessed static variables.

3. The method of claim 1 wherein the step of deriving includes extracting a model of the target system from the network, and setting evidence data in the model.

4. The method of claim 3 further including the step of acquiring the evidence data from a computing apparatus input device.

5. The method of claim 3 further including the step of acquiring the evidence data from sensors.

6. The method of claim 3 wherein the step of extracting a model employs a learning process to extract a Bayesian model from the network.

7. The method of claim 6 wherein the step of extracting a model employs an expectation-maximization process.

8. The method of claim 1 wherein the step of assigning different sub-trees assigns nodes in the different sub-trees based on required temporal resolution, available data resolution, and computational limitations.

9. The method of claim 1 wherein the step of assigning different sub-trees assigns nodes in the different sub-trees automatically.

10. The method of claim 1 further including the step of adding arcs from the identifier node to static nodes and to top-level dynamic nodes.

11. The method of claim 1 wherein the step of assigning different sub-trees in the network to the plurality of temporal variables assigns the variables in a temporal hierarchy at multiple time slices.

12. The method of claim 11 wherein the temporal variables are organized such that samples at instants of time are represented by nodes.

13. The method of claim 12 wherein the temporal variables are organized such that aggregate functions are represented at higher-level nodes.

14. The method of claim 13 wherein the aggregate functions include at least one of: mean, maxima, and minima.

15. The method of claim 1 wherein data used to develop the network are discretized.

16. The method of claim 1 wherein the step of deriving derives information about likely outcomes for the target system.

17. The method of claim 1 wherein the step of deriving derives information about causes of target system behavior.

18. The method of claim 1 wherein the steps of accessing, providing, assigning, and deriving are performed at least in part by computing apparatus, wherein the tree-structured belief network is stored in storage associated with the computing apparatus, and further including the step of presenting results of the step of deriving to a user on an output interface of the computing apparatus.

19. The method of claim 1 wherein the target system is a physical system and wherein the information derived for the target system is used to make changes to the physical system.

20. The method of claim 1 wherein the steps of providing and assigning are completely automatic.

21. The method of claim 1 wherein the step of accessing provides accesses a plurality of temporal variables and the step of providing provides a plurality of sub-trees for the accessed temporal variables, with each sub-tree corresponding to one of the accessed temporal variables.

22. A method of deriving information about the behavior of a target system, comprising:
receiving a model of the target system that is based on a tree-structured belief network in which:
an identifier node is provided at the top of a hierarchy of the belief network, and
a different sub-tree in the network assigned to each of one or more temporal variables, wherein nodes in the sub-tree are operative to hold evidence data of a same type at different levels of the sub-tree for each of the temporal variables, and wherein the evidence data at each of the different levels of each of the sub-trees is associated with a different level of granularity,
accessing evidence data, and
deriving information about the behavior of the target system for the evidence data based on the model.

23. A method of deriving information about behavior of a target system, comprising:
accessing one or more temporal variables for the target system,
providing an identifier node at the top of a hierarchy of a tree-structured belief network,
assigning a different sub-tree in the network to each of the temporal variables accessed in the step of accessing, wherein nodes in the sub-tree are operative to hold evidence data of a same type at different levels of the sub-tree for each of the temporal variables, and wherein the evidence data at each of the different levels of each of the sub-trees is associated with a different level of granularity, and
extracting a model of the target system from the network.

24. The method of claim 23 wherein the step of extracting a model employs a learning process to extract a Bayesian model from the network.

25. A system for deriving information about behavior of a target system, comprising:
a system interface,
machine-readable storage for a tree-structured belief network, and
tree-structured belief network interaction logic operative to interact with the system interface and a tree-structured belief network stored in the machine-readable storage, wherein the tree-structured belief network includes:
an identifier node at the top of a hierarchy of the tree-structured belief network, and
a different sub-tree in the network assigned to each of one or more temporal variables, wherein nodes in the sub-tree are operative to hold evidence data of a same type at different levels of the sub-tree for each of the temporal variables, and wherein the evidence data at each of the different levels of each of the sub-trees is associated with a different level of granularity.

26. A system for deriving information about behavior of a target system, comprising:
means for interacting with the system,
means for storing a tree-structured belief network, and
means for interacting with the system interface and a tree-structured belief network stored in the machine-readable storage, wherein the tree-structured belief network includes:
an identifier node at the top of a hierarchy of the tree-structured belief network, and
a different sub-tree in the network assigned to each of one or more temporal variables, wherein nodes in the sub-tree are operative to hold evidence data of a same type at different levels of the sub-tree for each of the temporal variables, and wherein the evidence data at each of the different levels of each of the sub-trees is associated with a different level of granularity.

27. A memory for storing data for access by computing apparatus, comprising:

an identifier node at the top of a hierarchy of a tree-structured belief network, and a different sub-tree in the network assigned to each of one or more temporal variables, wherein nodes in the sub-tree are operative to hold evidence data of a same type at different levels of the sub-tree for each of the temporal variables, and wherein the evidence data at each of the different levels of each of the sub-trees is associated with a different level of granularity.

* * * * *